(12) United States Patent
Brennan et al.

(10) Patent No.: US 7,504,964 B2
(45) Date of Patent: Mar. 17, 2009

(54) COMMUNICATIONS AND FEATURES PROTOCOL FOR A MEASURING WATER METER

(75) Inventors: Jim Brennan, Tallassee, AL (US); Jerry Lovett, Tallassee, AL (US); David Hamilton, Tallassee, AL (US); Tim Bianchi, Tallassee, AL (US)

(73) Assignee: Neptune Technology Group, Inc., Tallasee, AL (US)

( * ) Notice: Subject to any disclaimer, the term of this patent is extended or adjusted under 35 U.S.C. 154(b) by 322 days.

(21) Appl. No.: 10/701,028

(22) Filed: Nov. 4, 2003

(65) Prior Publication Data

US 2004/0113812 A1    Jun. 17, 2004

Related U.S. Application Data

(60) Provisional application No. 60/423,598, filed on Nov. 4, 2002.

(51) Int. Cl.
*G08B 1/00* (2006.01)
(52) U.S. Cl. .............................. 340/870.02; 340/10.51; 340/310.12
(58) Field of Classification Search ............ 340/870.02, 340/10.51, 310.12; 210/96.1; 700/283; 405/52; 116/204; 422/200
See application file for complete search history.

(56) References Cited

U.S. PATENT DOCUMENTS

| | | | |
|---|---|---|---|
| 4,348,730 A * | 9/1982 | Emerson et al. ............... 702/62 |
| 4,804,957 A | 2/1989 | Selph |
| 4,938,053 A * | 7/1990 | Jepson et al. .................. 73/196 |
| 5,252,967 A * | 10/1993 | Brennan et al. ......... 340/870.02 |
| 5,434,911 A * | 7/1995 | Gray et al. ............. 379/106.06 |
| 6,191,687 B1 * | 2/2001 | Dlugos et al. ............... 340/506 |
| 6,612,188 B2 * | 9/2003 | Hamilton .................. 73/861.78 |
| 6,653,945 B2 * | 11/2003 | Johnson et al. ......... 340/870.02 |
| 6,710,721 B1 | 3/2004 | Holowick |
| 6,755,148 B2 * | 6/2004 | Holowick .................... 116/204 |
| 6,778,099 B1 | 8/2004 | Meyer et al. |
| 6,798,352 B2 | 9/2004 | Holowick |
| 6,952,970 B1 * | 10/2005 | Furmidge et al. ......... 73/861.19 |

* cited by examiner

*Primary Examiner*—Brian A Zimmerman
*Assistant Examiner*—Hung Q Dang
(74) *Attorney, Agent, or Firm*—David E. Mixon; Bradley Arant Boult Cummings LLP

(57) ABSTRACT

A measuring meter system with communications and features protocols for monitoring the meter has been developed. The system includes a meter that monitors usage of a distribution system, an electronic data recorder that processes data from the meter, and an external unit that controls the processing of data in the electronic data recorder with a communication protocol. The communication protocol includes an initialization signal, an interval identification signal, and a clock signal.

40 Claims, 8 Drawing Sheets

| Leak Detection Current | Bit Value |
|---|---|
| Less than 1st threshold value (50) of time intervals (15 min.) where $V_{min}$ is exceeded during the previous 24-hr period. INITIAL VALUE. | 00 |
| Between 1st and 2nd threshold values (50-95). | 01 |
| Greater than 2nd threshold value (96 15 min intervals). | 10 |
| Feature not available | 11 |

Figure 11

| Days of Continuous Leak | Bit Values |
|---|---|
| 0    INITIAL VALUE | 000 |
| 1-2 | 001 |
| 3-7 | 010 |
| 8-14 | 011 |
| 15-21 | 100 |
| 22-34 | 101 |
| 35 ALL | 110 |
| Feature not available | 111 |

Figure 12

Flow/Direction Indication

| Flow Rate | LCD Display | Bit Value |
|---|---|---|
| Zero | None | 00 |
| $Q_{START}$ (±) | ⇨ or ⇦ | 01 |
| ½ Max Flow (±) | ▫⇨ or ⇦▫ | 10 |
| Feature Not Available | NONE | 11 |

Figure 13a

| Consecutive Days of No Flow | Bit Values |
|---|---|
| 0    INITIAL VALUE | 000 |
| 1-2 | 001 |
| 3-7 | 010 |
| 8-14 | 011 |
| 15-21 | 100 |
| 22-34 | 101 |
| 35 ALL | 110 |
| Feature not available | 111 |

Figure 13b

| Days with no flow | Bit Value |
|---|---|
| Less than 1$^{st}$ threshold value (7days). INITIAL VALUE | 00 |
| Between 1$^{st}$ and 2$^{nd}$ threshold values (7 – 14 days). | 01 |
| Greater than 2$^{nd}$ threshold value (14 days). | 10 |
| Feature not available. | 11 |

Figure 13c

| PCBV Measurement | Indication | Bit Value |
|---|---|---|
| Zero - Min Value | Peak Continuous Back-flow Volume (PCBV) for last 35 days was below Min Value. INITIAL VALUE | 00 |
| Min Value - Max Value | PCBV for last 35 days was between Min Value and Max Value. Abnormal Indication for application with Backflow protection. Normal Indication for application without Backflow protection. | 01 |
| > Max Value | PCBV exceeded Max Value during last 35 days. Abnormal Indication for any application. | 10 |
| Unknown | Feature not available | 11 |

Figure 14

| PBV Measurement | Indication | Bit Value |
|---|---|---|
| Zero - Min Value | Peak Back-flow Volume (PBV) for last 35 days was below Min Value. INITIAL VALUE | 00 |
| Min Value - Max Value | PBV for last 35 days was between Min Value and Max Value. Abnormal Indication for application with Backflow protection. Normal Indication for application without Backflow protection. | 01 |
| > Max Value | PBV exceeded Max Value during last 35 days. | 10 |
| Unknown | Feature not available | 11 |

Figure 15

COMMUNICATIONS AND FEATURES PROTOCOL FOR A MEASURING WATER METER

CROSS-REFERENCE TO RELATED APPLICATIONS

This application claims priority from U.S. Provisional Application No. 60/423,598 for "Electronic Coding Self Powered Water Meter" that was filed on Nov. 4, 2002.

BACKGROUND OF INVENTION

1. Field of the Invention

The invention relates generally to measuring meters. More specifically, the invention relates to communications and data protocols of a data recorder for a measuring meter.

2. Background Art

Meters that measure usage of a material based on flow are widely used to keep track of the consumption of an end user. For example, utility companies that supply water to their customers typically charge for their product based on usage. Usage of water is typically measured by a meter that is installed for each individual customer on their respective water supply line. A utility company employee periodically (usually once a month) manually collects the reading from the meter. These readings are usually cumulative, so the amount of usage for the present period is calculated by subtracting the reading from the previous period. Once the usage is calculated, the customer is billed for that amount of water used during that period.

Manually reading usage meters is labor intensive, time consuming expensive, and subject to human error especially for residential customers because each meter monitors relatively little usage as compared with larger, commercial customers. As a result, electronic meters have been used to allow for quicker, more efficient, and more accurate collection of usage data. The electronic meters measure usage by monitoring flow through a conventional, mechanical meter. The usage readings are stored electronically and then transmitted via radio signals to a local transmitter/receiver operated by the utility.

However, electronic meters require a power source. Typically, such a meter relies on a battery for power. The battery must be replaced manually which is another time consuming and expensive process. Additionally, if the battery fails, the utility may be unable to determine the correct usage at the meter and consequently under bill the customer.

SUMMARY OF INVENTION

In some aspects, the invention relates to an apparatus for monitoring a meter, comprising: a meter that monitors usage of a distribution system; an electronic data recorder that processes data from the meter; an external unit that controls the processing of data in the electronic data recorder with a communication protocol; and where the communication protocol comprises, an initialization signal, an interval identification signal, and a clock signal.

In other aspects, the invention relates to an apparatus for monitoring meter usage, comprising: a meter that monitors usage of a distribution system; means for receiving data from the meter; means for processing data from the meter; and means for detecting a leak in the distribution system.

In other aspects, the invention relates to a method for calculating utility usage patterns, comprising: receiving usage data from a meter that monitors usage of a distribution system; processing the usage data to calculate utility usage patterns; and where the utility usage patterns identify predefined conditions in the distribution system.

In other aspects, the invention relates to a method for calculating utility usage patterns, comprising: step for receiving usage data of a distribution system; step for processing the usage data to calculate utility usage patterns; and step for identifying predefined conditions in the distribution system based on the utility usage patterns.

Other aspects and advantages of the invention will be apparent from the following description and the appended claims.

BRIEF DESCRIPTION OF DRAWINGS

It should be noted that identical features in different drawings are shown with the same reference numeral.

FIG. 11 shows a chart with the bit values for a leak detection (current) feature in accordance with one embodiment of the present invention.

FIG. 12 shows a chart with the bit values for a leak detection (days) feature in accordance with one embodiment of the present invention.

FIG. 13a shows a chart with the bit values and LCD displays for a flow/direction feature in accordance with one embodiment of the present invention.

FIG. 13b shows a chart with the bit values for a no-flow feature (3-bit) in accordance with one embodiment of the present invention.

FIG. 13c shows a chart with the bit values for a no-flow feature (2-bit) in accordance with one embodiment of the present invention.

FIG. 14 shows a chart with the bit values for a peak continuous backflow feature in accordance with one embodiment of the present invention.

FIG. 15 shows a chart with the bit values for a peak backflow feature in accordance with one embodiment of the present invention.

DETAILED DESCRIPTION

A measuring meter with a communications and features protocol that allows for monitoring of customer usage data has been developed. The measuring meter measures and records volumetric usage of a material as it passes through the meter. The meter could be used in utility applications to measure water, gas or electricity usage. Additionally, such meters are commonly used in industrial applications to measure the flowrates of various components. In this section, a self-powered water meter in a utility application will be used to describe various embodiments of the present invention. However, it should be understood that the invention as described, can be applied to many different types of measuring meters in a wide variety of applications.

Figure 1:
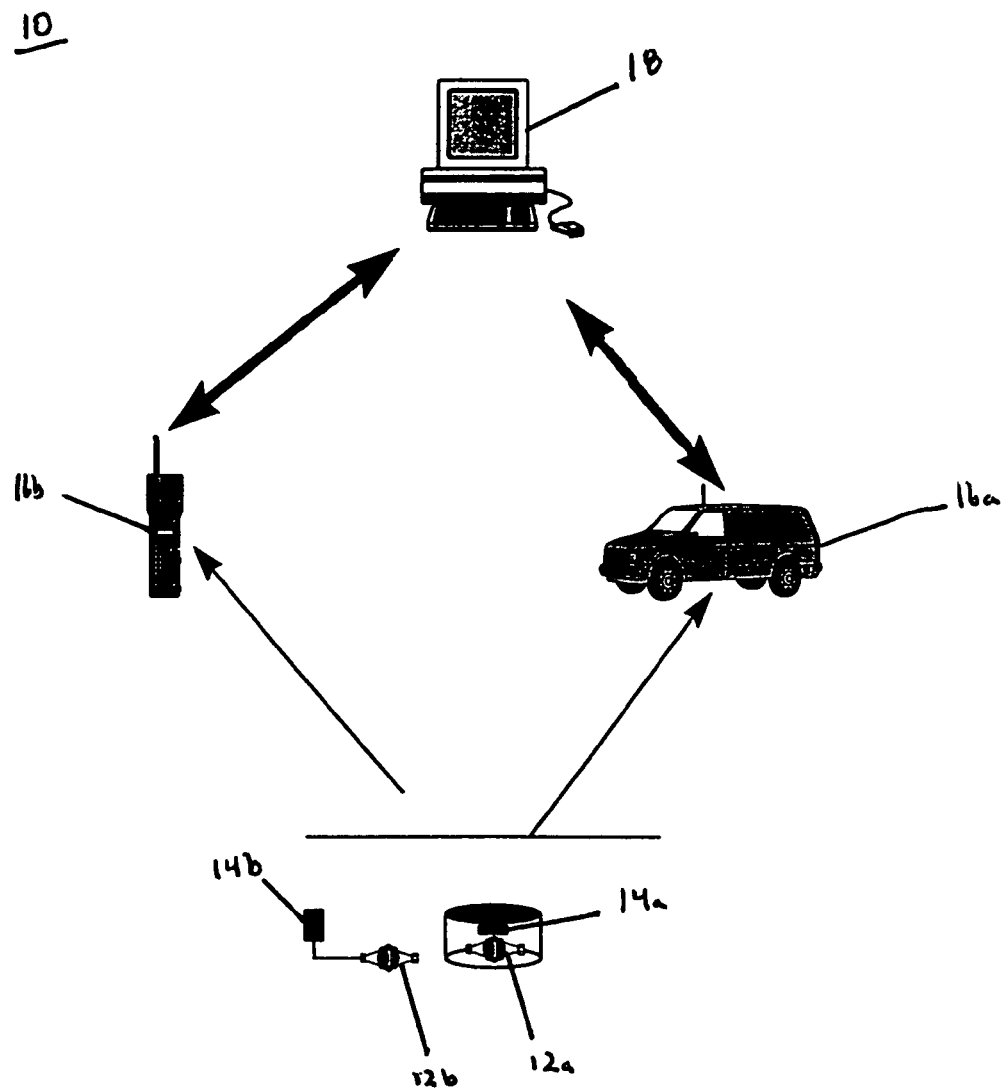
FIG. 1 shows a diagram of an electronic water meter monitoring system in accordance with one embodiment of the present invention.

FIG. 1 shows a diagram of an electronic water meter monitoring system 10 in accordance with one embodiment of the present invention. The system 10 includes an electronic water meter 12a or 12b for an individual customer. The meter is typically located at a point on the customer's individual supply line between the customer and utility's main supply line. A meter interface unit (MIU) 14a or 14b is connected to the respective meter 12a or 12b. The MIU 14a or 14b is an electronic device that collects meter usage data from an electronic register on its respective meter and transmits the data to a local transmitter/receiver 16a or 16b via radio signals. In alternative embodiments, other external devices could be used such as a laptop computer, a data logger, or other suitable device known in the art. In other embodiments, the MIU or similar external device could be integrated as an internal component of the meter. Two alternative embodiments of the electronic water meters are shown. The first embodiment includes a meter 12a and MIU 14a that are located underground or a "pit" unit. The other embodiment includes a meter 12b and MIU 14b that are located above ground. Two alternative types of transmitter/receivers 16a and 16b are also shown. The first transmitter/receiver 16a is mounted in a vehicle while the other transmitter/receiver is a handheld unit 16b. An additional type of transmitter/receiver may be permanently mounted at a location central to multiple meters and MIUs. Each of these transmitter/receivers allows utility personnel to receive usage data without manually reading each individual meter. Instead, when each transmitter/receiver 16a and 16b is within range of a meter 12a or 12b, the data from the meter is transmitted to the transmitter/receiver that in turn transmits it to the computer system of the utility 18. The computer system 18 then calculates the usage of each customer based on the data. Appropriate billing for each customer is then generated by the utility.

The electronic water meters of the system are self powered by an internal "Wiegand Wire". The Wiegand Wire is a device that generates electrical signals when it is exposed to a magnetic field with changing flux polarity. The wire may also be used to induce voltage across a coil located near the wire. The polarity of the magnetic field is changed by relying on the kinetic energy of the fluid moving through the meter. In some embodiments, the fluid turns an internal water wheel that in turn rotates an attached shaft as it moves through the meter. Multiple magnets are arranged on a circular disc that is attached to the rotating shaft. As the circular disc rotates along with the shaft, the movement of the magnets induces alternating fields of magnetic flux within the Wiegand Wire that is located in close proximity to the disc. The signals generated by the wire due to the changes in the magnetic flux are used to power the electronic circuits that monitor the meter. The rate, volume, and direction of fluid flow through the meter may also be determined by analyzing the number and rate of signals generated by the wire.

Figure 2:
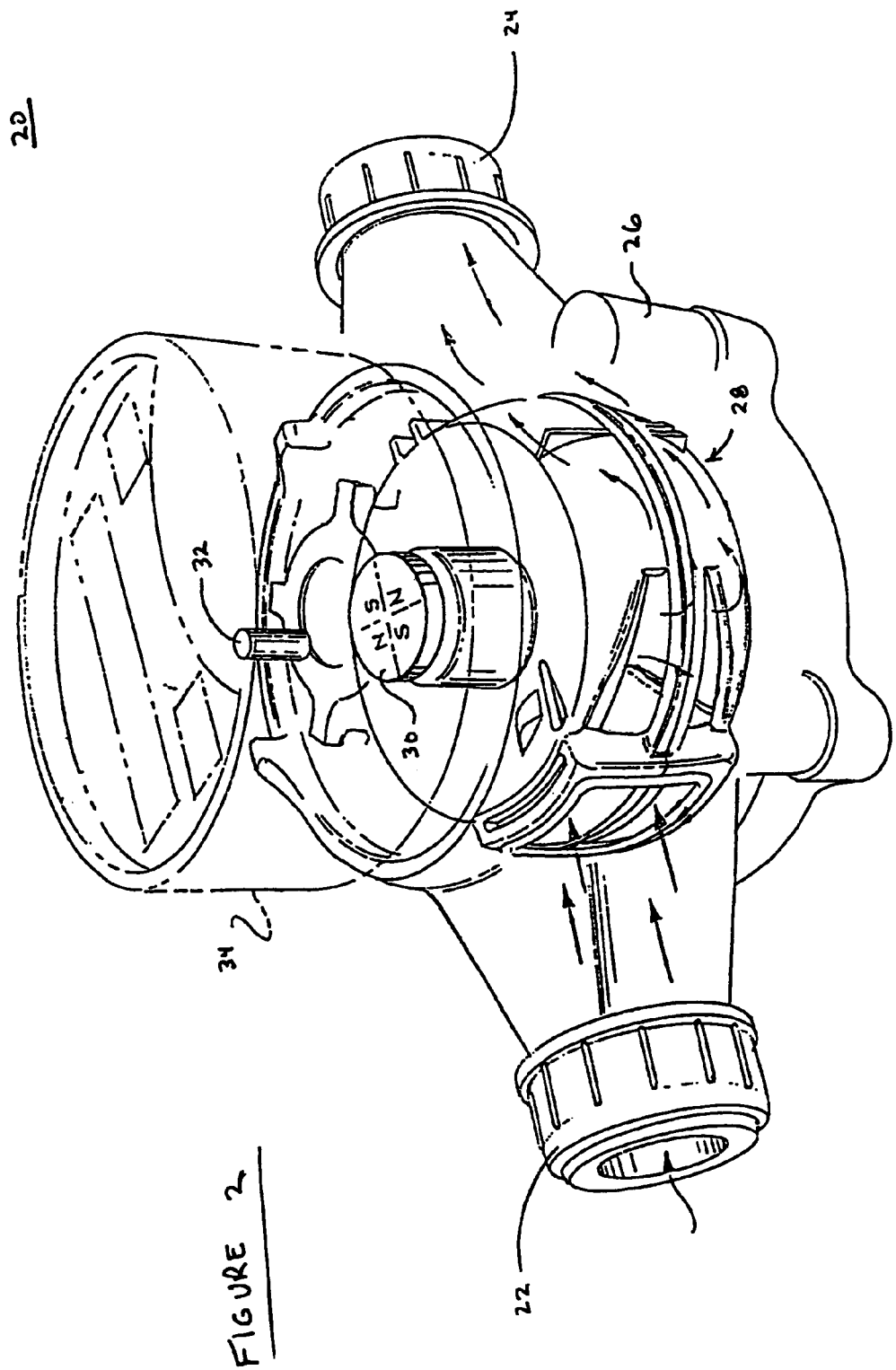
FIG. 2 shows a cut-away diagram of a self-powered water meter in accordance with one embodiment of the present invention.

FIG. 2 shows a cut-away diagram of a self-powered electronic water meter 20 in accordance with one embodiment of the present invention. In this embodiment, the electronic water meter 20 is connected to a water supply line at the meter's inflow connector 22. Water flows from the supply line through the connector 22 into the meter body 26 and out through the outflow connector 24 to the customer. As the water flows through the meter body 26, it forces an internal flow wheel 28 to nutate. The nutating flow wheel 28 in turn rotates a circular magnetic disc 30 that is connected to the flow wheel 28 by a shaft (not shown). The disc 30 in this embodiment is shown with four separate magnetic zones (labeled "N" and "S" for the polar orientation of each zone) that make up a four pole magnet. In other embodiments, different configurations of magnets could be used.

As the magnetic disc 30 rotates, it changes the magnetic flux polarity for the Wiegand Wire sensor 32 that is located adjacent to the disc 30. As described previously, the changes in polarity induce signals that are generated by the sensor 32. These signals represent data concerning the water flow through the meter 20 and also provide power to the electronic circuits of the meter. Specifically, the stream of signals corresponds to the rate and direction of the water flow through the meter. The flow rate of the water through the meter 20 is calibrated to the rate of rotation of the flow wheel 28, the magnetic disc 30, and the signal stream generated by the sensor 32. In FIG. 2, only one Wiegand Wire sensor 32 is shown in use with the meter 20. It should be understood that multiple sensors could be used in a meter for alternative embodiments of the present invention. In other embodiments, a secondary magnet assembly is located in the EDR. The secondary magnet is coupled to the magnetic disc so that it rotates as the disc rotates. As the secondary magnet rotates, it changes the magnetic flux polarity for the Wiegand Wire sensors.

Figure 3:
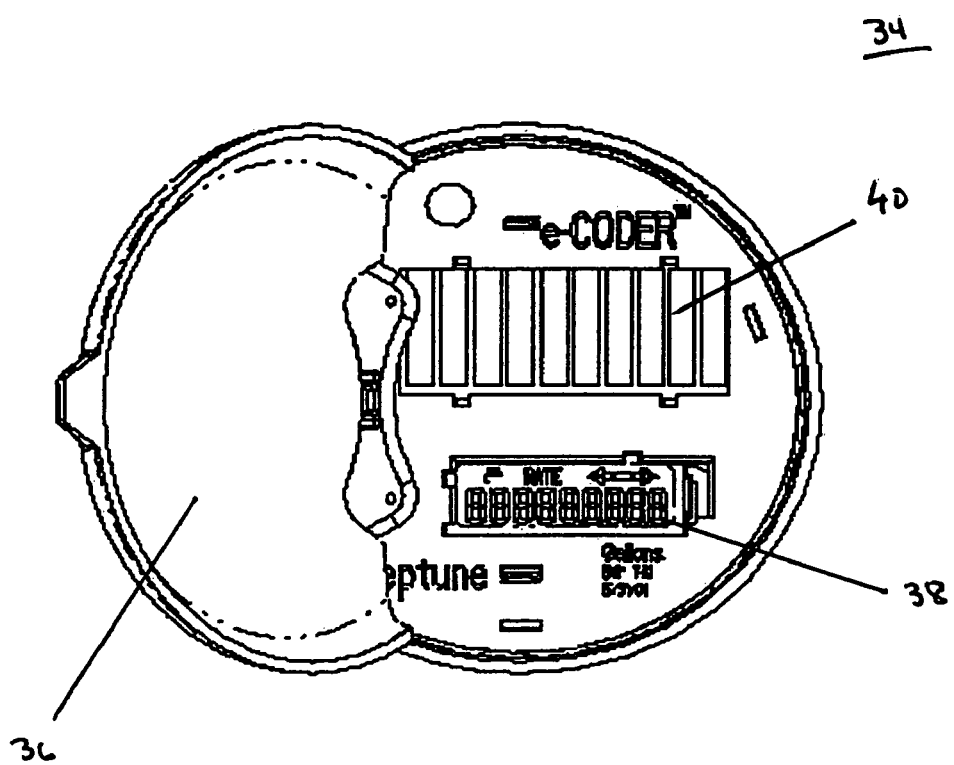
FIG. 3 shows a view of the display of an electronic data recorder in accordance with one embodiment of the present invention.

The data is processed and stored in an electronic data recorder 34 that is attached to the meter 20. The recorder 34 contains an ASIC (Application Specific Integrated Circuit) chip that processes the signal stream from the Wiegand Wire sensor 32 using the energy contained within the signal stream. In other embodiments, additional processing can be performed by an external device that may also provide power to the system. In some embodiments, non-volatile memory is located within the ASIC. This memory serves to store the data. FIG. 3 shows a view of the display of the top of the electronic data recorder 34. The recorder 34 has a cover 36 (shown in the open position) that protects the display 38 from dirt, debris, etc. The display 38 itself is a series of LCDs (Liquid Crystal Displays) that show data. In the present embodiment, nine digits may be shown by the LCDs. In alternative embodiments, other types and numbers of display schemes could be used. The display is powered by bank of solar cells 40 that are exposed to sunlight or other light source when the cover 36 is opened. The display is convenient to use by the property owner or the utility in case a manual reading of the meter is necessary due to failure of an MIU or other system component.

Figure 4:
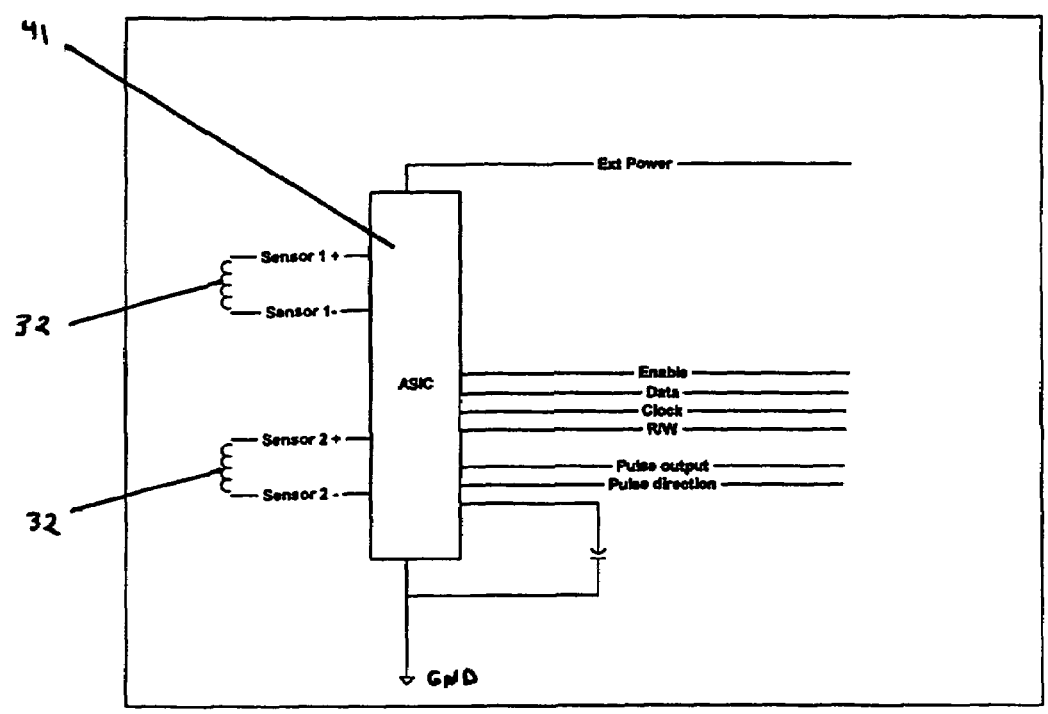
FIG. 4 shows a block diagram of the ASIC circuitry of the electronic data recorder in accordance with one embodiment of the present invention.

FIG. 4 shows a block diagram of the ASIC circuitry of the electronic data recorder (EDR). In this embodiment, two Wiegand Wire sensors 32 are used to supply two separate data streams to the ASIC 41. Other connections to the ASIC include a power supply (EXT POWER) that is external to the ASIC and a ground (GND) connection. The host (not shown) is an electronic circuit within the EDR 34 with a microprocessor that is powered by the solar cell 40, or the MIU 14a or 14b. The external power supply line is used by the host to access the data stored in the non-volatile memory embedded in the ASIC. Other connections for the ASIC include: an enable signal (ENABLE); a data signal (DATA); a clock signal (CLOCK); a read/write signal (R/W); an output signal (PULSE OUTPUT); and a direction signal (PULSE DIRECTION). Each of these connections passes through a host interface (not shown) to rest of the data recorder. While the EDR is described here as a separate element from the meter, it should be understood that the EDR could be integrated as part of the meter in an alternative embodiment.

The EDR clock signal is a steady stream of timing signals that synchronize communication operations of the data system. The frequency of a clock signal is typically in the order of thousands of cycles per second. The units of measurement are hertz (Hz) which is a cycle per second. Another alternative unit of measurement is kilohertz (kHz) which is a thousand cycles per second.

In one embodiment, the electronic meter communicates using a clock signal with a frequency of 1200 Hz or 1.2 kHz. This EDR clock signal is typically transmitted via wires from an MIU to each electronic meter. In other embodiments that operate multiple meters in a network mode, the EDR clock signal may operate at 19.2 kHz. In the present embodiment, the electronic data recorder calculates usage data on 15 minute intervals or "reading cycles" that result in 96 data readings per 24 hour period. The usage data is typically stored in the system memory and is available for transmission to the utility.

Figure 5:
FIG. 5 shows a timing diagram of a clock signal operating at 1200 Hz in accordance with one embodiment of the present invention.
Figure 6:
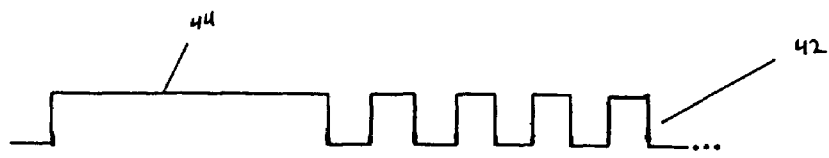
FIG. 6 shows a timing diagram of an initialization signal followed by a clock signal operating at 1200 Hz in accordance with one embodiment of the present invention.

FIG. 5 shows a timing diagram of a clock signal 42 at 1200 Hz. When an external device such as an MIU 14a or 14b is ready to begin taking a data reading from the EDR 34, an initialization signal is sent. FIG. 6 shows a timing diagram of an initialization signal 44 followed by a clock signal 42 operating at 1200 Hz. In the present embodiment, the initialization signal 44 is a single long first signal for a duration of 50 milliseconds (mSec). However, in alternative embodiments, the duration of the signal may be as short as 25 mSec or as long as 100 mSec. The initialization signal serves to activate the host to receive, process and store the data from the meter. After the initialization signal 44, the signal switches back to the clock signal at 1200 Hz.

In one embodiment of the invention, a communications protocol is used to activate the electronic data recorder with its ASIC and take a data reading at regular intervals for a specified period. The communications protocol includes: an initialization signal; an interval identification signal; and a clock signal. In this embodiment, the specified period is one hour with four separate readings at 15 minute intervals. These readings are referred to as: the "0 Minute Reading"; the "15 Minute Reading"; the "30 Minute Reading"; and the "45 Minute Reading".

Figure 7:
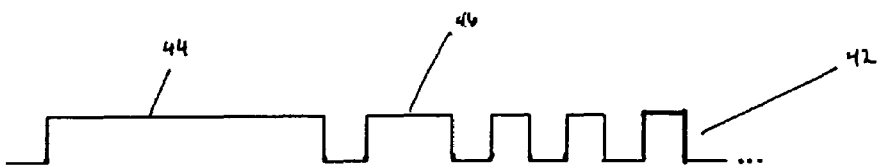
FIG. 7 shows a timing diagram of an initialization signal followed by a cycle identification signal and a clock signal operating at 1200 Hz in accordance with one embodiment of the present invention.
Figure 8:
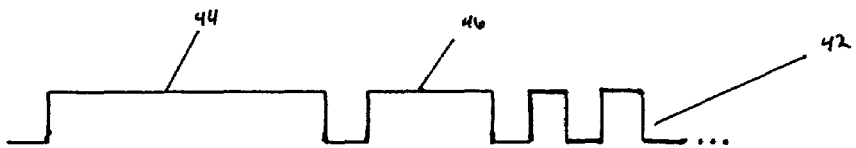
FIG. 8 shows a timing diagram of an initialization signal followed by an alternative cycle identification signal and a clock signal operating at 1200 Hz in accordance with one embodiment of the present invention.
Figure 9:
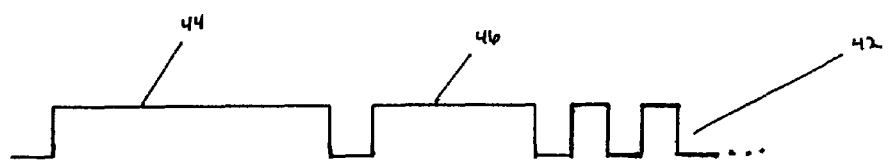
FIG. 9 shows a timing diagram of an initialization signal followed by an alternative cycle identification signal and a clock signal operating at 1200 Hz in accordance with one embodiment of the present invention.
Figure 10A:
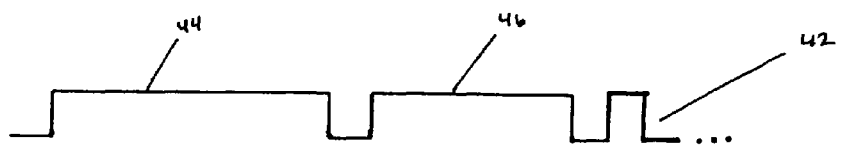
FIG. 10a shows a timing diagram of an initialization signal followed by an alternative cycle identification signal and a clock signal operating at 1200 Hz in accordance with one embodiment of the present invention.
Figure 10B:
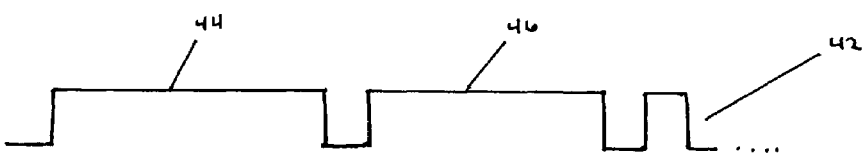
FIG. 10b shows a timing diagram of an initialization signal followed by an alternative cycle identification signal and a clock signal operating at 1200 Hz in accordance with one embodiment of the present invention.

At the beginning of each 15 minute interval, an initialization signal 44 is sent with the clock signal. It is immediately followed by interval identification signal 46 that identifies which 15 minute cycle is being recorded. FIG. 7 shows a timing diagram of an initialization signal 44 followed by an interval identification signal 46 and a clock signal 42 operating at 1200 Hz. In the embodiment shown, the interval identification signal 46 is two 1200 Hz signal widths in duration. The term "signal width" should be understood to be one half the duration of a full signal cycle that includes a high phase and a low phase. This signal 46 identifies the first 15 minute cycle reading of a specified period. The first reading is referred to as the "0 Minute Reading". FIG. 8 shows a timing diagram for the second 15 minute cycle reading referred to as the "15 Minute Reading". As in FIG. 7, the initialization signal 44 is followed by an interval identification signal 46 and a clock signal 42 operating at 1200 Hz. However, the identification signal 46 is three 1200 Hz signal widths. FIG. 9 shows a timing diagram for the third 15 minute cycle reading referred to as the "30 Minute Reading". As in FIGS. 7 and 8, the initialization signal 44 is followed by an interval identification signal 46 and a clock signal 42 operating at 1200 Hz. However, the identification signal 46 is four 1200 Hz signal widths. FIG. 10a shows a timing diagram for the fourth 15 minute cycle reading referred to as the "45 Minute Reading". As in FIGS. 7-9, the initialization signal 44 is followed by an interval identification signal 46 and a clock signal 42 operating at 1200 Hz. However, the identification signal 46 is five 1200 Hz signal widths. In some instances, a specialized reading outside of the 15-minute intervals may be necessary. Such a specialized cycle reading may be identified by a special identification signal such as six 1200 Hz signal widths or any other unique width. FIG. 10b shows a timing diagram with an initialization signal 44 that is followed by an interval identification signal 46 and a clock signal 42 operating at 1200 Hz. In this example, the interval identification signal 46 is six 1200 Hz signal widths wide. This signal allows a reading to be taken without incrementing the internal 15-minute clock or updating any time related calculations. It is important to realize that the key feature of the timing signals is the "interval identification signal". The interval identification signal serves to identify the expiration of a time period or a non-timed interval request for information.

The 15 minute reading intervals are used to ensure a proper reading sequence. If the reading intervals are received in the proper sequence, the data is stored. However, if a reading interval is received out of sequence, all of the stored time dependent data is reset to the initial values. The storage of data is resumed once reading intervals are received in the proper sequence. This allows the system to compensate for a situation where the meter is disconnected from the EDR and later reconnected.

In an alternative embodiment, during an error with a cycle reading the system will automatically expect the next scheduled identification signal for the next reading cycle. For example, if the "15 Minute Reading" (an identification signal of three 1200 Hz signal widths) is not received for some reason, the system will automatically expect the next reading to be identified as the "30 Minute Reading" (an identification signal of four 1200 Hz signal widths). This prevents an error in one reading cycle from perpetuating with subsequent reading cycles and corrupting all of the following data.

An advantage of the present invention is that the identification signal for each cycle reading is based on a multiple of the width of a single clock signal. However, readings could be taken at different intervals and for differing time periods in alternative embodiments. For example, four separate readings could be taken at 30 minute intervals over a 2 hour time period. Additionally, other widths and frequencies of initializations signals, interval identification signals and clock signals could be used in alternative embodiments.

Once the system is initialized and the correct reading interval is identified, the data from the meter is processed by the host and stored in the non-volatile memory embedded in the ASIC. In addition to basic information such as water usage, the present invention is capable of monitoring other data to provide additional features about the customer's usage to the utility. These features include: leak detection in the current time period; leak detection over a period of days; flow/direction indication; absence of flow over a period of days; and backflow detection. The data for these features are stored as "bits" or binary numbers at designated sections or "registers" in the memory. Each register typically contains 2 or 3 bits depending on the number of potential values that are necessary for the data of the respective feature. However, more bits could be used in alternative embodiments.

The leak detection feature involves first establishing a minimum volume ($V_{min}$) during the specified time period. The $V_{min}$ for a particular meter based on its size and capacity and it is typically provided by the manufacturer of the meter. In the present embodiment, $V_{min}$ is 0.1 gal during 15 minute time period. If the flow volume through the meter continuously exceeds $V_{min}$ for each 15 minute interval during the previous 24 hour period, a leak is probably present since water usage should be below the $V_{min}$ during "off-peak" hours. Examples of off-peak hours are between midnight and early morning.

During normal operation, the system monitors each 15 minute cycle to determine if the flow volume exceeds $V_{min}$. As this occurs, the system keeps count of the number of cycles that exceed $V_{min}$. A pre-determined threshold value is established for a specified number of cycles that exceed $V_{min}$ during a 24 hour period. If the threshold value is exceeded, it an indication of a possible leak. In the present embodiment of 96 separate reading cycles of 15 minutes each during a 24 hour period, the threshold value is 50. This means that if $V_{min}$ is exceeded for 50 cycles of the previous 96 cycles, the system will indicate a possible leak. In alternative embodiments, multiple thresholds could be used to indicate the constancy of the leak. For example, a first threshold value of 50 could be set to indicate an intermittent leak while a second threshold value of 96 could be set to indicate a continuous system leak.

FIG. 11 shows a chart indicating the bit values that indicate the presence of a leak. The embodiment shown uses two threshold values to indicate the constancy of a leak as described previously. The "00" bit value indicates that the first threshold value of 50-95 reading cycles where the flow volume exceeds $V_{min}$, has not been exceeded. This is in the initial value of the system and it indicates that a leak is not present. The "01" bit value indicates that the first threshold value of 50-95 reading cycles has been met but not exceeded. This is an indication that a possible intermittent leak is present in the system. The "10" bit value indicates the second threshold value of 96 has been met. This is an indication that a possible continuous leak is present in the system. The "11" bit value indicates that the leak detection feature is not available with this embodiment of the present invention.

If a leak is indicated by either the "01" or "10" bit value, a system alarm is activated to notify the utility. The alarm may take the form of an LCD indication on the display of the meter and/or a signal relayed to the utility computer system. Personnel may then be dispatched to confirm the presence of the leak and make any necessary repairs. In other embodiments, differing threshold values could be used. Additionally, more bit values could be used to accommodate the use of more than two thresholds values.

Another feature that works in conjunction with the leak detection is a determination of the total number of days that a leak was detected. In the present embodiment, the system monitors the number of days that an intermittent and/or continuous leak is indicated. FIG. 12 shows a chart of the bit values that indicate the number of days a continuous leak has been detected. In this embodiment, a 3-bit value is used in order to increase the precision and range of the feature. The "000" bit value indicates that a leak has not been detected. This is the initial value for the system. The "001" bit value indicates that 1-2 days of leakage has been detected. The "010" bit value indicates that 3-7 days of leakage has been detected. The "011" bit value indicates that 8-14 days of leakage has been detected. The "100" bit value indicates that 15-21 days of leakage has been detected. The "101" bit value indicates that 22-34 days of leakage has been detected. The "110" bit value indicates that more than 35 days of leakage has been detected. The "111" bit value indicates that the feature is not available in this embodiment of the system. In alternative embodiments, differing ranges of days could be used for the differing bit values. Additionally, more bit values could be used to increase the total number of possible days of leakage that could be recorded. An alternative embodiment could use the bit values in FIG. 12 to indicate the number of detected leak days that are either intermittent or continuous.

Another feature available in the present embodiment is an indicator of flow/direction for the meter. This feature shows the relative rate and direction of water flow through a meter at any given LCD update cycle. In the present embodiment, the host updates the LCD every ½ second when there is sufficient energy provided by the solar cell. The feature also shows the direction of flow through the meter (i.e., either forward or backward). The rate and direction of water flow is valuable information for the utility as a way of detecting malfunctions and/or fraud in the system. The type of fraud that is detected typically involves the customer physically disconnecting the meter from the supply line in order to receive water without the usage being recorded. Another type of fraud involves the customer reversing the direction of the meter so that it "runs backwards". In this case, actual water usage by customer results in negative usage or "backflow" being recorded by the system. The customer, in effect, takes water off his record of usage.

FIG. 13a shows a chart with the bit values and LCD icon status for a flow/direction feature for use with embodiments of the present invention. Several different relative flow rates are predetermined for the meter. "Zero" indicates no flow through the meter. "QSTART" indicates a normal usage flowrate that is established for the system. "½ Max Flow" indicates that the flowrate has reached half of the maximum flow rate for the particular meter. The LCD icons are used to show the status of the flow/direction of the meter to utility personnel upon visual inspection. For a no flow situation, the flow icons are off on the LCD display. If the flowrate meets the "QSTART" level, a single arrow icon shown. If the flowrate meets the "½ Max Flow" level, a single arrow icon with a trailing hash mark icon is shown. The arrow icons for both the "QSTART" level and the "½ Max Flow" level also indicate the direction of flow. Additionally, the arrow icons are marked with a "+" sign to indicate a positive flow and a "−" to indicate a negative or back flow. The "00" bit value indicates no flow has been detected at the meter. The "01" bit value indicates that a flowrate of "QSTART" has been detected at the meter since the last LCD update period. The "10" bit value indicates that a flowrate of "½ Max Flow" has been detected. The "11" bit value indicates that the flow/direction feature is not available for this embodiment of the system.

Another feature that works in conjunction with the flow/direction feature is the ability of monitoring consecutive days with no flow through the meter. This feature is useful in detecting possible fraud because it is highly unlikely that most customers will go several days with no flow through their meter. If the monitoring system detects no flow over predetermined number of days, personnel from the utility may be dispatched to inspect the meter for fraud or a malfunction.

This feature functions in similar manner as previously described for monitoring the continuous days of leakage and shown in FIG. 12. FIG. 13b shows a chart with a 3-bit value in one embodiment of this feature. The "000" bit value indicates that there have been no consecutive days with no flow through the meter during the previous 35 day period. This is the initial value of the system. The "001" bit value indicates that 1-2 days of no flow has been detected. The "010" bit value indicates that 3-7 days of no flow has been detected. The "011" bit value indicates that 8-14 days of no flow has been detected. The "100" bit value indicates that 15-21 days of no flow has been detected. The "101" bit value indicates that 22-34 days of no flow has been detected. The "110" bit value indicates that more than 35 days of no flow has been detected. The "111" bit value indicates that the feature is not available in this embodiment of the system. In alternative embodiments, differing ranges of days could be used for the differing bit values. Additionally, more bit values could be used to increase the total number of possible days of no flow that could be recorded.

FIG. 13c shows a chart with a 2-bit value in an alternative embodiment of this feature. This feature functions in similar manner for monitoring leakage with several threshold values as previously described and shown in FIG. 11. However, in this embodiment two threshold values are established for a certain number of days with no flow. The first threshold value is 7 days with no flow. The second threshold value is 14 days with no flow. The "00" bit value indicates that the first threshold value of 7 days has not been exceeded. This is in the initial value of the system. The "01" bit value indicates that the first threshold value of 7-14 days of no flow has been met but not exceeded. This is also an indication that possible fraud or a malfunction in the system. The "10" bit value indicates the second threshold value 14 days of no flow has been met. This is also an indication of possible ongoing fraud or a malfunction in the system. The "11" bit value indicates that this feature is not available with this embodiment of the present invention.

Another embodiment of the present invention is a feature to detect backflow through the meter. "Backflow" is simply a reversal of flow through the meter. It is a possible indication of fraud where the customer has reversed the orientation of the meter so that water usage by the customer runs the meter in reverse and removes usage from the meter. In some systems, "backflow preventers" are installed in the system to prevent the reversal of the direction of flow. Typically, these are a type of one-way valve that is well known in the art. If a backflow preventer is installed on the system, a detection of backflow by this feature could indicate a malfunction or failure of the backflow preventer.

FIG. 14 shows a chart with the bit values for a peak continuous backflow volume (PCBV) feature. This embodiment of the feature measures the continuous backflow volume spanning consecutive 15 minute periods. In the embodiment shown, the system monitors the meter for continuous backflow during the previous 35 day period. Every system typically has some level of backflow if a backflow preventer is not present. If a backflow preventer is present, any measured backflow volume would be an indication of a possible problem. This normal level of backflow is taken into account by establishing a "Min Value" threshold for the system with a backflow preventer. In the present embodiment, the value is 0.1 gallons. A "Max Value" is also established to indicate an abnormal level of backflow for a system without a backflow preventer. In the present embodiment, the value is 10.0 gallons. As shown in the chart, the "00" bit value indicates that the PCBV for the last 35 day period was below the Min Value level. This is indicates a normal condition for any system either with or without a backflow preventer. This is also the initial value of the system. The "01" bit value indicates that the PCBV for the last 35 day period was above the Min Value level but below the Max Value level. This indicates an abnormal condition (fraud or malfunction) for a system with a backflow preventer. It indicates a normal condition for a system with no backflow preventer. The "10" bit level indicates that the PCBV level for the last 35 day period was above the Max Value level. This indicates an abnormal condition (fraud or malfunction) for any system with or without a backflow preventer. The "11" bit value indicates that this feature is not available with this embodiment of the present invention. In other embodiments, differing threshold values could be used according to system characteristics. Additionally, more bit values could be used to accommodate the use of more than two thresholds values.

An alternative embodiment for detecting backflow involves monitoring for peak backflow volume (PBV) instead of peak continuous backflow volume as described previously. This technique measures a one-time surge or "peak" backflow volume through the meter in any timing interval. As previous described, every system typically has some level of backflow. As in the prior embodiment, the normal level of backflow is taken into account by establishing a "Min Value" threshold for the system with a backflow preventer. A "Max Value" is also established to indicate the abnormal level of backflow for a system without a backflow preventer. FIG. 15 shows a chart of the bit values for a PBV monitoring feature. In the embodiment shown, the system monitors the meter for peak backflow volume during any 15 minute cycle during the previous 35 day period. As shown in the chart, the "00" bit value indicates that the PBV for the last 35 day period was below the Min Value level. This is indicates a normal condition for any system either with or without a backflow preventer. This is also the initial value of the system. The "01" bit value indicates that the PBV for the last 35 day period was above the Min Value level but below the Max Value level. This indicates an abnormal condition (fraud or malfunction) for a system with a backflow preventer. It indicates a normal condition for a system with no backflow preventer. The "10" bit level indicates that the PBV level for the last 35 day period was above the Max Value level. This indicates an abnormal condition (fraud or malfunction) for any system with or without a backflow preventer. The "11" bit value indicates that this feature is not available with this embodiment of the present invention. In other embodiments, differing threshold values could be used according to system characteristics. Additionally, more bit values could be used to accommodate the use of more than two thresholds values.

In describing the various communications protocols and features available for the present invention, it is important to note that various embodiments may use some, none or all of the features and protocols. The individual utilities may decide what aspects and features to use based on their system needs and capabilities. Additionally, each of the values shown for the communications protocols and features may vary according to the needs of the utility. As such, the present invention offers great flexibility for automated system monitoring including leak detection and fraud detection for an electronic meter system that is self powered by a Wiegand Wire.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. An apparatus for monitoring a meter, comprising:
a meter that monitors usage of a distribution system;
an electronic data recorder that processes data from the meter;
an external unit that controls the processing of data in the electronic data recorder with a communication protocol; and
where the communication protocol comprises,
an initialization signal,
an interval identification signal that identifies a present reading cycle for the data from the meter with a unique signal width of the interval identification signal, where the unique signal width comprises a multiple of a signal cycle width, and
a clock signal.

2. The apparatus of claim 1, where the meter is a utility meter.

3. The apparatus of claim 2, where the utility meter is a water meter.

4. The apparatus of claim 3, where the water meter is self-powered.

5. The apparatus of claim 4, where the water meter is power by a Wiegand Wire.

6. The apparatus of claim 5, where the Wiegand Wire powers the electronic data recorder.

7. The apparatus of claim 1, where the external unit is a meter interface unit.

8. The apparatus of claim 1, where the initialization signal is between 25 and 100 milliseconds in duration.

9. The apparatus of claim 1, where the clock signal operates at a frequency of 1200 hertz.

10. The apparatus of claim 1, where the clock signal operates at a frequency of 19.2 kilohertz.

11. The apparatus of claim 1, where the electronic data recorder is activated on 15 minute intervals by the communications protocol.

12. The apparatus of claim 11, where the interval identification signal identifies each 15 minute interval in a one hour time period.

13. The apparatus of claim 1, where the electronic data recorder processes data from the meter to detect a leak in the distribution system.

14. The apparatus of claim 13, where the leak is continuous.

15. The apparatus of claim 13, where the leak is intermittent.

16. The apparatus of claim 13, where the electronic data recorder further processes data from the meter to determine how long the leak has been present.

17. The apparatus of claim 1, where the electronic data recorder processes data from the meter to determine a flowrate in the distribution system.

18. The apparatus of claim 1, where the electronic data recorder processes data from the meter to determine the direction of a flow in the distribution system.

19. The apparatus of claim 1, where the electronic data recorder processes data from the meter to detect an absence of a flow in the distribution system.

20. An apparatus for monitoring a meter, comprising:
a meter that monitors usage of a distribution system;
an electronic data recorder that processes data from the meter to detect an absence of a flow in the distribution system and determine how long the flow has been absent;
an external unit that controls the processing of data in the electronic data recorder with a communication protocol; and
where the communication protocol comprises,
an initialization signal,
an interval identification signal that identifies a present reading cycle for the data from the meter with a unique signal width of the interval identification signal, where the unique signal width comprises a multiple of a signal cycle width, and
a clock signal.

21. The apparatus of claim 20, where the electronic data recorder processes data from the meter to detect backflow in the distribution system.

22. The apparatus of claim 21, where the backflow is continuous.

23. An apparatus for monitoring meter usage, comprising:
a meter that monitors usage of a distribution system;
means for receiving data from the meter;
means for processing data from the meter, where the means for processing data from the meter is controlled by an external unit with a communication protocol that comprises,
an initialization signal,
an interval identification signal that identifies a present reading cycle for the data from the meter with a unique signal width of the interval identification signal, where the unique signal width comprises a multiple of a signal cycle width, and
a clock signal; and
means for detecting a leak in the distribution system.

24. The apparatus of claim 23, further comprising:
means for determining a flowrate in the distribution system.

25. The apparatus of claim 23, further comprising:
means for determining the direction of a flow in the distribution system.

26. The apparatus of claim 23, further comprising:
means for detecting an absence of a flow in the distribution system.

27. The apparatus of claim 23, further comprising:
means for detecting a backflow in the distribution system.

28. A method for calculating utility usage patterns, comprising:
receiving usage data from a meter that monitors usage of a distribution system;
processing the usage data to calculate utility usage patterns, where the step for processing the usage data is controlled by an external unit with a communication protocol that comprises,
an initialization signal,
an interval identification signal that identifies a present reading cycle for the usage data with a unique signal width of the interval identification signal, where the unique signal width comprises a multiple of a signal cycle width, and
a clock signal; and
where the utility usage patterns identify predefined conditions in the distribution system.

29. The method of claim 28, where the predefined conditions are indicated in levels of magnitude.

30. The method of claim 29, where the predefined conditions are indicated in at least 3 levels of magnitude.

31. The method of claim 28, where the utility usage patterns are determined on a moving time scale.

32. The method of claim 28, where the predefined conditions comprise a leak in the distribution system.

33. The method of claim 28, where the predefined conditions comprise a flowrate in the distribution system.

34. The method of claim 28, where the predefined conditions comprise the direction of a flow in the distribution system.

35. The method of claim 28, where the predefined conditions comprise an absence of a flow in the distribution system.

36. The method of claim 28, where the predefined conditions comprise a backflow in the distribution system.

37. The method of claim 28, where the meter is a water meter.

38. The method of claim 37, where the water meter is self-powered.

39. The method of claim 38, where the water meter is powered by a Wiegand Wire.

40. A method for calculating utility usage patterns, comprising:

step for receiving usage data of a distribution system;

step for processing the usage data to calculate utility usage patterns, where the step for processing the usage data is controlled by an external unit with a communication protocol that comprises, an initialization signal, an interval identification signal that identifies a present reading cycle for the usage data with a unique signal width of the interval identification signal, where the unique signal width comprises a multiple of a signal cycle width, and a clock signal; and step for identifying predefined conditions in the distribution system based on the utility usage patterns.

* * * * *